United States Patent [19]

Jung

[11] Patent Number: 5,004,006
[45] Date of Patent: Apr. 2, 1991

[54] TWO-WAY FLOW VALVE

[75] Inventor: Rüdiger Jung, St. Ingbert, Fed. Rep. of Germany

[73] Assignee: Flutec Fluidtechnische Gerate GmbH, Fed. Rep. of Germany

[21] Appl. No.: 490,377

[22] Filed: Mar. 8, 1990

[30] Foreign Application Priority Data

Mar. 15, 1989 [DE] Fed. Rep. of Germany ....... 3908377

[51] Int. Cl.$^5$ ............................................. G05D 7/01
[52] U.S. Cl. ................................................... 137/501
[58] Field of Search ......................................... 137/501

[56] References Cited

U.S. PATENT DOCUMENTS

| | | | |
|---|---|---|---|
| 2,865,397 | 12/1958 | Chenault | 137/501 X |
| 3,428,080 | 2/1969 | Brown | 137/501 |
| 4,074,693 | 2/1978 | Kates | 137/501 X |
| 4,250,915 | 2/1981 | Rikuta | 137/501 |

FOREIGN PATENT DOCUMENTS

| | | |
|---|---|---|
| 2432823 | 1/1976 | Fed. Rep. of Germany . |
| 2917851 | 11/1980 | Fed. Rep. of Germany . |
| 3119406 | 12/1982 | Fed. Rep. of Germany . |
| 3211545 | 10/1983 | Fed. Rep. of Germany . |

Primary Examiner—Robert G. Nilson
Attorney, Agent, or Firm—Roylance, Abrams, Berdo & Goodman

[57] ABSTRACT

A two-way flow control valve has an independent adjustment for the volume of a throughput fluid flow and a pick-up of the pressure at the entrance or inlet of the valve. This fluid pressure generates at least one force component acting on a correcting element, opposing the effective force of an accumulator and opposing the effective force of the fluid pressure generated at the outlet of the valve. With the correcting element, the volume of throughput fluid flow can be controlled at the outlet of the valve.

17 Claims, 1 Drawing Sheet

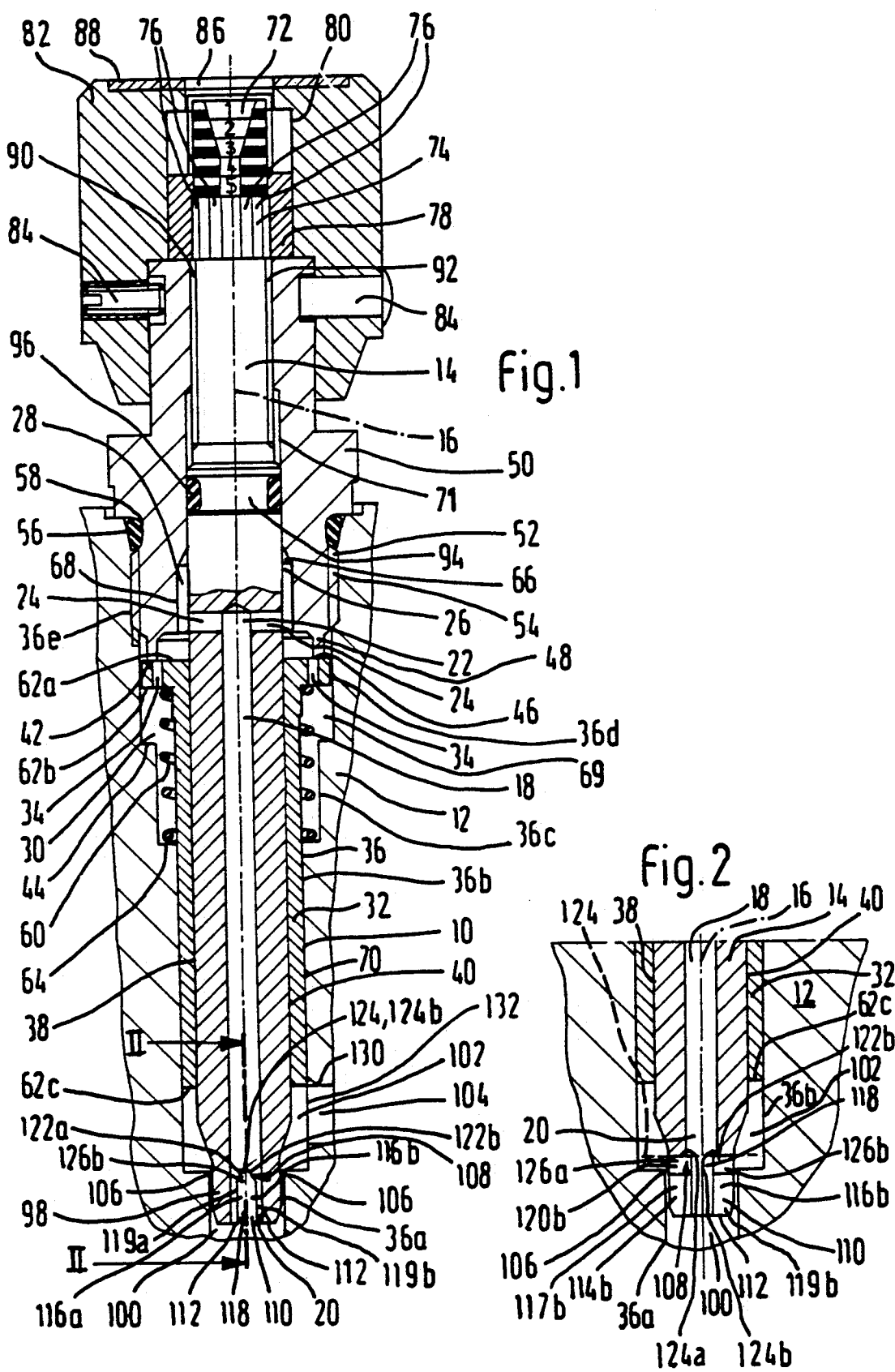

TWO-WAY FLOW VALVE

FIELD OF INVENTION

The present invention relates to a valve a two-way flow control valve which independently adjusts the flow into the valve and automatically corrects the fluid volume of the valve outlet.

BACKGROUND OF THE INVENTION

Two-way flow control valves presently commercially available are either flow control valves found in cartridge type constructions, configured as continuous flow control valves, or are flow control valves in housing type constructions.

With the flow control valves embodied in cartridges, various different measuring diaphragms with variable diameters are required to control the throughput flow throughout the entire area of application which comes into consideration. Independent control or adjustment over the entire area of application is therefore not possible. The fine setting of the volume of the flow in these valves occurs within a throughput area defined by the diaphragm by means of variation of the tension, and concurrently by modification of the required adjustment pressure differential. Various different diaphragms must be provided for different flow characteristic factors, so that the readiness-maintenance and the continuous maintenance of the measuring diaphragm is costly. Also, with flow volume modification over the adjustment area, the valve must be opened. Thus some means of engagement in the inside valve structure is to be undertaken.

On the other hand, in the case of flow control valves in housing structures of the traditional type, the flow can be adjusted over the entire area of application without exchange of the measuring diaphragm. However, this is attained by a constructively costly structures with noncontinuous operation of the means for independent adjustment of the volume of the flow (measuring diaphragm) and the correcting member (operating piston). The measuring diaphragms which are used in this case are configured as independently adjustable impedance (or butterfly) valves, which vary the diameters of the measuring diaphragms. The operating piston or piston manometer is arranged externally in a suitable receiving bore. Auxiliary bores are required in somewhat detailed arrangements for connection of the operational units. With these types of flow control valves, the measuring diaphragm and the piston manometer are arranged in a housing structure. Auxiliary bores and/or compound-filled annular passages are also required in this case. Consequently, an unfavorable flow guide begins to form in the valve, so that a relatively small area of application in comparison with the dimensions of the structure is involved in the valves of this type. Also, the types of structures disclosed in this case are of costly construction and considerable volumes are required.

For flow control valves in cartridges and for flow control valves in housing structures, the possibility exists of working with two sets of guides. However the danger of jamming arises, which can cause erroneous function when these valves are used.

SUMMARY OF THE INVENTION

An object of the present invention is to provide a flow control valve, particularly a two-way flow control valve, in the form of a modular unit which can be employed either in the cartridge structure or in the housing structure.

Another object of the present invention is to provide a flow volume control valve wherein the flow is independently adjustable over the entire area of application, without any external auxiliary bores, annular passages or unregulated double guide assemblies.

The foregoing objects are obtained by a flow control valve, comprising an inlet and an outlet, adjustment means for independently varying volume of throughput fluid flow between the inlet and said outlet, first pressure means for receiving fluid pressure at the inlet, and correcting means at the outlet for regulating throughput fluid flow at the outlet. The first pressure means includes a compensator bore. The correcting means includes a correcting member exposed to the fluid pressure at the outlet applying a force thereon in a first direction, and an accumulator applying a biasing force on the correcting member in the first direction. The correcting member also is exposed to the fluid pressure at the inlet through the compensator bore to apply force on the correcting member in a second direction opposite to the first direction.

With the adjustment means for receiving the pressure present at the inlet into the valve, a portion of the independently adjustable volume of fluid flowing into the valve can be conducted further into the correcting member. The correcting member regulates the flow throughput flowing through the valve dependent upon an equilibrium of forces including the effective force of an accumulator, the effective force of the fluid pressure generated at the outlet of the valve, and an effective force component of the fluid pressure present at the inlet into the valve. Thus, the volume of fluid flowing through the valve is held constant, even over the entire area of the flow. The flow can be independently controlled or adjusted with the adjustment means provided for this purpose, even when flow changes occur at the inlet into and/or the outlet from the valve. Also, an extraordinarily compact structure of the valve can be attained as a result of this arrangement.

The means for independent adjustment of the volume flow can be formed as a measuring diaphragm incorporating a slotted hole which has at least two sides. The sides can end in at least one line of communication, with the sides running into each other in an acute angle. A fine setting of the adjustment of the throughput flow through the valve is possible by this arrangement.

The receiving bore in the valve housing or in the cartridge can include bore portions with diameters progressively decreasing in the direction of the measuring diaphragm. When the valve according to the present invention is placed in such receiving bore, such receiving bore can be produced by means of a one-sided, and thus, low-cost boring process.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 1 is a side elevational view in section of a valve in the receiving bore of a valve housing according to the present invention; and FIG. 2 is an enlarged, partial, side elevational view in section of the valve taken along line II—II of FIG. 1.

DETAILED DESCRIPTION OF THE INVENTION

FIG. 1 shows the valve according to the present invention held in a receiving bore 10 of a valve housing 12. Instead of valve housing 12, however, a cartridge could also be used, through which the receiving bore would pass similarly as in the housing. The valve has an impedance or throttle spindle 14, with a compensator bore 18 passing along the longitudinal axis 16 of its bottom half. The bottom end 20 of bore 18, as seen in FIG. 1, opens into an external system. The top end 22 of bore 18, as seen in FIG. 1, is connected through two transverse bores 24, running horizontally in FIG. 1, with a first compression chamber 26.

The first compression chamber 26 is divided, in FIG. 1, into a top partial chamber 28 and a bottom partial chamber 30 by means of an operating piston or correcting member 32. Technically piston 32 can also be described as piston manometer.

At the dividing point of first compression chamber 26, operating piston 32, as is particularly shown in FIG. 1, has two connection bores 34 which connect the top partial chamber 28 with the bottom partial chamber 30. Operating piston 32 is arranged longitudinally movably within this first compression chamber 26, and is guided along the wall 36 of receiving bore 10 and the outside wall 38 of impedance spindle 14. For this purpose, the operating piston 32 is configured to be essentially T-shaped. In its longitudinal direction, piston 32 has a continuous bore 40 passing all the way through it to receive impedance spindle 14. To make longitudinal guiding of operating piston 32 in first compression chamber 26 more precise, the longitudinal beam or portion of the T-shaped operating piston 32 slides in the receiving bore 10 along a wall segment 36b of wall 36, while the disk-shaped crossbeam is guided on its outside periphery along a wall segment 36d. The diameter of wall segment 36d is greater than that of wall segment 36b. The movement of operating piston 32 during its longitudinal travel, as is shown especially in FIG. 1, is limited by a top annular boss 42 and a bottom annular boss 44. Top annular boss 42 is formed on the bottom side wall 46 of a ring 48 as seen in FIG. 1. Ring 48 is part of a valve assembly 50. Valve assembly 50 can be screwed by means of an outside thread 52 into a thread 54 formed on a wall segment 36e of wall 36 of receiving bore 10. Valve assembly 50 is illustrated in FIG. 1 in its screwed-in setting occupied following installation in valve housing 12. The inside of the valve can then be sealed by a gasket 56, arranged in a recess 58 of valve housing 50.

Bottom annular boss 44 is formed from an interruption in wall 36 of receiving bore 10, obtained by the different bore diameters of wall segments 36c and 36d. Wall segment 36c has a diameter sized between the bore diameters of wall segments 36b and 36d of wall 36, and is selected to be of such dimensions that another accumulator, in the form of a pressure spring 60, can be arranged between wall segment 36c and the outside wall of the longitudinal beam of the T-shaped operating piston 32.

Operating piston 32 has three surfaces 62a, 62b and 62c which can be acted upon by a fluid. Surface 62a of operating piston 32 is over top boss 42 and has the largest dimensions. The surface 62b is next consecutively in the series, is arranged on the bottom of the cross beam of T-shaped operating piston 32, and is the middle-sized surface. The smallest surface 62c is arranged at the bottom end of operating piston 32. The sum of the surface dimensions of smallest surface 62c and middle-sized surface 62b equal the dimensions of the largest piston surface 62a of operating piston 32.

Pressure spring 60 has a top end engaged against middle-sized surface 62b and an opposite bottom end engaged against an annular boss 64 in wall 36 of receiving bore 10. In the position of the valve in FIG. 1, pressure spring 60 presses operating piston 32 against stationary top boss 42 on valve element 50 connected tightly with the valve housing 12.

Top partial chamber 28 of the first compression chamber 26 is formed by a hollow space 66. Partial chamber 28 is limited by an inside wall 68 of valve assembly 50, the outside wall 38 of impedance spindle 14 and surface 62a.

Bottom partial chamber 30, on the other hand, is formed by a hollow space 69. Partial chamber 30 limited by wall segments 36c and 36d of wall 36, outside wall 70 of operating piston 32, and middle-sized surface 62b.

Impedance spindle 14 is guided into a middle bore 71 of valve assembly 50 and extends the entire length of valve assembly 50. In the position shown in FIG. 1, spindle 14 is shown in one of its extended settings. At its outer end, in FIG. 1, impedance spindle 14 has a calibrating scale 72, provided with the measurement markings "1" to "5". Half-steps can also be registered because of the cross-hatching. This calibrating scale 72 is connected with a longitudinal guide member 74 having individual longitudinal guides 76 running parallel to the longitudinal axis 16 of the housing and guided in correspondingly formed grooves of a projecting portion 78. This projecting portion 78 is guided rotatably and axially movably in recess 80 of a correcting or adjusting element 82 to rotate spindle 14 relative to assembly 50. Element 82 provides manual operation of impedance spindle 14.

In the valve setting shown in FIG. 1, projecting portion 78, which guides the longitudinal guide member 74 for impedance spindle 14, is propped on the top of valve assembly 50.

Correcting element 82 tightly surrounds the top portion of valve assembly 50, as shown in FIG. 1, and is rotatably connected with valve assembly 50 but is axially immovable in the direction of longitudinal axis 16 of the valve by means of removable bolt connections 84. For secure incorporation of calibrating scale 72, correcting element 82 includes a through-passage 86 at its tip, which passage is bordered by a calibrating plate 88. The surface of plate 88 is worked and/or numbered in the horizontal plane to simplify the reading of calibrating scale 72, insofar as scale 72 lies with its calibration in a plane with the top of the calibrating plate 88 or else projects out over calibrating plate 88.

Between compensator bore 18 and longitudinal guide member 74, impedance spindle 14, adjacent longitudinal guide member 74, has a threaded segment 90 on its outside wall 38. Threaded segment 90 engages with its thread intervals in corresponding thread intervals on the inside periphery 92 of valve assembly 50.

The aforementioned thread intervals are intended as single threads. Such threads are arranged in such a manner that with one complete revolution of correcting element 82 by hand, in other words with a revolution of 360°, one scale part "1", "2", "3", "4" or "5" is located with its bottom line at the in-series subsequent scale part in a plane with the top of calibrating plate 88.

Instead of these single thread arrangements, multiple threads could also be used. Multiple threads could be installed in such a manner that a different translation ratio is then obtained. In other words, for instance, with only a small number of revolutions of correction element 82, a greater adjustment path of impedance spindle 14 or the like can be obtained.

Furthermore, beneath its thread segment 90, impedance spindle 14 has a shoulder 94 of reduced diameter. A gasket 96 is arranged around shoulder 94, and seals the first compression chamber 26 from the outside environment.

At the bottom end, as shown in FIG. 1, throttle or impedance spindle 14 tapers conically into a cylindrical tail-like end section 98. This tail-end section 98 engages in an inlet connection 100 representing the entrance or inlet into the valve. Connection 100 is connected by a line (not shown) to some installation, for instance a hydraulic pump which can be motor-operated, and can feed fluid under a certain pressure and in a certain volume to connection 100. This connection 100 is in the form of a bore in valve housing 12. The wall segment 36a of connection 100 has diameter smaller than that of the following wall segment 36b of receiving bore 10 above wall segment 36a.

Connection 100, as is shown especially in FIGS. 1 and 2, opens into a second compression chamber 102. Chamber 102 is limited by the smallest piston surface 62c of operating piston 32 and a part of wall segment 36b of wall 36 of receiving bore 10, as well as by the tail-end section 98 of impedance spindle 14, and forms the outlet of the valve. Furthermore, this second compression chamber 102 has an outlet connection 104 with a diameter corresponding essentially to the diameter of connection 100. Connection 104 is attached through a conduit (not shown) to a fluid receiver, for instance in the form of a hydraulic pump (not shown).

At the point where connection 100 opens into second compression chamber 102, the bottom end of impedance spindle 14 (i.e., tail-end section 98) engages in extends into connection 100 such that outside wall 38 of impedance spindle 14 is movably guided at this point along wall segment 36a of receiving bore 10 and is then guided through the bore. Thus, dependent upon the dimensions of the bore diameter of connection 100, impedance spindle 14 is conically tapered suitably for its engagement in this connection. The bottom end of impedance spindle 14, as is to be described hereinafter, is configured so that, together with the border 106 formed at the point of transition between wall segment 36a and wall segment 36b of receiving bore 10, it forms a measuring diaphragm or calibration orifice indicated in its entirety as number 108.

Impedance spindle 14 has a slotted hole 110 at its bottom end for measuring diaphragm 108. Hole 110 extends all the way through spindle 14 essentially horizontally and perpendicular to longitudinal axis 16 of the valve. This slotted hole 110 opens, as shown in FIGS. 1 and 2, with its bottom end 112 within connection 100. Furthermore, slotted hole 110 comprises pairs of slotted hole halves 114 a and b and 116 a and b lying adjacent to and facing one another. In FIG. 1 only the one pair of slotted hole halves 116a, 116b turned toward the viewer is shown. The other pair of slotted hole halves 114a, 114b is arranged in the plane of view of the viewer similar to a perspective view but opposite the viewer, with the one pair of slotted hole halves 116a, 116b behind the other pair of slotted hole halves 114a, 114b. FIG. 2 clarifies this, in that it shows the arrangement of the slotted hole halves 114b and 116b of the pairs of slotted hole halves 114 a, b and 116 a, b.

Each of these pairs of slotted hole halves 114 a, b, 116 a, b with its walls 117 a, b and 119 a, b, as is particularly shown in FIG. 2, limits a passage 118. Passage 118 opens into connection 100, and thus, connects compensator bore 18 with connection 100. Walls 117 a, b and 119 a, b of the two pairs of slotted hole halves 114 a, b and 116 a, b run together at their top ends, as seen in FIGS. 1 and 2, with the two pairs of sides 120 a, b and 122 a, b in turn coming together in a line of communication 124a or 124b. These lines lie on a imaginary line of communication 124 extending essentially horizontally and perpendicular to longitudinal axis 16 of impedance spindle 14 and of the valve.

The adjacent pairs of sides 120 a, b and 122 a, b of each pair come together to form an acute angle. The walls 117 a, b and 119 a, b of pairs of slotted hole halves 114 a, b and 116 a, b incorporate the side wall impedance spindle 14 completely, so that the intermediate spaces 126 a,b formed by walls 117 a, b and 119 a, b connect passage 118 of compensator bore 18 with the second compression chamber 102. The imaginary line of communication 124 is raised only so far above the border 106 formed by valve housing 12 to provide connection of compensator bore 18 of impedance spindle 14 with second compression chamber 102.

The outlet area of the valve is formed by second compression chamber 102. Chamber 102 is connected directly to intermediate chambers 126 a, b as these chambers project out and upward over border 106 of the valve housing 12. In this case, the valve is opened further the further the line of communication 124 is moved upward away from and above border 106 of valve 12, in its position shown in FIGS. 1 and 2, by means impedance spindle 14. This upward movement increases the distance of the relevant side pairs 120 a, b and 122 a, b above border 106 and increases the intermediate space 126a or 126b above border 106, so that the volume of fluid arriving from connection 100 is conducted into second compression chamber 102 and increases progressively with the thrust of impedance spindle 14 in the valve. If impedance spindle 14 is raised further by operation of correcting element 82, then the two side pairs 120 a, b and 122 a, b occupy their greatest possible distance from border 106 and finally the wall segments of walls 117 a,b and 119 a,b running parallel to one another and parallel to longitudinal axis 16 appear above border 106. The throughput volume increases accordingly.

The valve according to the present invention is adjusted so that impedance spindle 14 with its tail-end section 98, whatever the volume setting at any point, still similarly projects partially into connection 100. The fluid volume is then forced to flow over measuring diaphragm 108. If impedance spindle 14 were to be raised excessively, the tail-end section 98 would come out of engagement with connection 100 and the fluid would flow with a flanking movement of measuring diaphragm 108 directly into connection 104 through second compression chamber 102.

In its nonoperational setting (shown in FIG. 1), surface 62a is pressed against boss 42 of valve assembly 50 by means of pressure spring 60. Operational piston 32, with its bottom surface 62c, then essentially seals the bore wall 130 of connection 104 seen at its top in FIG. 1. The point at which connection 104 opens into second compression chamber 102 can be sealed off by operational piston 32. As a result of this, a standard diaphragm is formed at the point of the opening of connection 104 into second compression chamber 102, by means of which the throughput volume of the fluid flowing through the valve can be regulated.

The method of operation of this flow control valve is explained in greater detail hereinafter. In this explanation, in order to give an example of the operation, the flow control valve is placed in a hydraulic circuit in which load-dependent pressure deviations could be expected to occur.

The valve is represented in its nonoperational position in FIG. 1. In this nonoperational position, operational piston 32 is pressed by means of pressure spring 60 against the top boss 42 of valve assembly 50. Fluid, under a certain amount of pressure in connection 100, flows through passage 118, compensator bore 18 and transverse bores 24 into top partial chamber 28. From chamber 28, the fluid flows through connection bores 34 into bottom partial chamber 30 of the, first compression chamber 26. Thus, the pressure acting in connection 100 appears in the entire first compression chamber 26, and acts upon surfaces 62a and 62b. Because of the pressure in the first compression chamber 26 and on surfaces 62a and 62b, the effective surface 62c of operational piston 32 essentially terminates with the top of bore wall 130 of connection 104. Line of communication 124, as is shown especially in FIG. 1, lies essentially in the plane with border 106 of valve housing 12, so that no fluid under pressure and ready for use in connection 100 can be fed through intermediate chambers 126 a, b into second compression chamber 102 and through the other connection 104. When the valve is in this nonoperational position, calibrating scale 72, as shown in FIG. 1, is located beneath calibrating plate 88, so that it is apparent to the operator that the valve is out of its position of operation.

If the operator now rotates correcting element 82 in the proper direction of rotation, the connection of projecting portion 78 with correcting element 82 and the engagement with longitudinal guide member 74 cause throttle spindle 14, by virtue of its threaded segment 90 (seen at the top of FIG. 1) to raise up and consequently to move into its retracted positions. Thus, line of communication 124 is moved away from border 106 of valve housing 12 and, for instance, may take the position shown in FIG. 2. In this position, measuring diaphragm 108 provides the independent passage for the fluid under pressure through passage 118 of compensator bore 18 into second compression chamber 102 and then to the other connection 104. The further the impedance spindle 14 is moved by correcting element 82, the more the line of communication 124 is moved upward and away from border 106 and the greater is the volume of fluid flowing over both of the slotted hole halves 114 a, b and 116 a, b into second compression chamber 102 and through connection 104. As a result of this, the top end of impedance spindle 14 is also moved axially, guided rotatably by means of longitudinal guides 76 in longitudinal guide member 74, further upward, so that calibrating scale 72 projects out over calibrating plate 88 of correcting element 82. This projection allows the relevant valve setting to be read, in other words the setting of the measuring diaphragm 108, and with that of the volume flow.

As already explained, the significance of flow valves of this type is for holding the throughput constant independent of the pressure differential which is generated between inlet into and outlet from the valve. Thus, the once adjusted oil or fluid flow remains constant even during pressure deviations. In the flow valve according to the present invention, the fluid under pressure in connection 100 is conducted through compensator bore 18 and two transverse bores 24 into first compression chamber 26. This pressure chamber is subdivided into two partial chambers 28 and 30 connected through connection bores 34 in the operational piston. In these two partial chambers 28 and 30 of first compression chamber 26, and on the two surfaces 62a and 62b of operational piston 32, the pressure of the fluid in connection 100 is adjusted and regulated. If the impedance spindle is in the setting shown in FIG. 2, the fluid in connection 100 under some presupposable pressure flows over both pairs of slotted hole halves 114 a, b and 116 a, b into second compression chamber 102.

A different pressure is supplied in compression chamber 102 than in connection 100. Since the other connection 104, opposite second compression chamber 102, is modified by changing its effective cross sectional surface, essentially its bore diameter, a different pressure is set in this connection 104 than in second compression chamber 102. If the valve according to the present invention is the position shown in FIG. 2, and if the pressure in connection 100 is constant, the pressure receiver connected to connection 104 is supplied with a fluid in a certain quantity and under constant pressure. The pressure in connection 100 is greater than that in compression chamber 102, which in turn is greater than the pressure generated in connection 104. In the flow direction toward connection 104, there is therefore a progressively increasing pressure drop.

If in connection 100, operated by the hydraulic system in which the valve according to the present invention is placed, fluid volume flow increases, the increased flow would be transmitted directly to the second compression chamber 102 and connection 104 of the valve if operational piston 32 were not present. The pressure increase at connection 100 and in compensator bore 18 causes a pressure increase in first compression chamber 26. Since the pressure generated in connection 100 is present in the top and bottom partial chambers 28 an 30 of first compression chamber 26 and on surfaces 62a and 62b of operational piston 32, the only effective surface is the piston manometer formed by surface 62c of operational piston 32.

The pressure present in first compression chamber 26 is now greater than the pressure generated when the valve occupies its position shown in FIG. 1. The equilibrium of forces on operational piston 32 causes the piston to be thrust downward, reducing the free cross section of standard diaphragm or calibration orifice 132. The volume flow is adjustable as desired at the series-connected standard diaphragm 132 dependent upon the equilibrium of forces on the piston manometer in the form of the operation piston 32 and dependent upon the dimensions of the measuring diaphragm 108 independently adjustable by the spindle. Since standard diaphragm 132 now is somewhat reduced in dimensions, the fluid flow through this standard diaphragm is also reduced. Operational piston 32 is then adjusted and set, according to the equilibrium of forces generated therein, in a position in which the throughput flow through the valve is constant.

In FIGS. 1 and 2, slotted hole 110 is configured as a slit and tongue slot, having two sides extending relative to one another into an acute angle, allowing an especially fine control of the valve for the throughput flow. For finer adjustment, the more abrupt or the more acute the angle must be between the sides. Instead of this notched-slotted hole shown in FIGS. 1 and 2, however, other slotted holes can also be conceivable, in which the shape of the notch is configured otherwise. For instance, the notch shape need not be triangular as shown in FIGS. 1 and 2, but rather rectangular or the like.

While various embodiments have been chosen to illustrate the invention, it will be understood by those skilled in the art that various changes and modifications can be made therein without departing from the scope of the invention as defined in the appended claims.

What is claimed is:

1. A flow control valve, comprising:
    an inlet and an outlet;
    adjustment means for independently varying volume of throughput fluid flow between said inlet and said outlet;
    first pressure means for receiving fluid pressure at said inlet, said first pressure means including a compensator bore extending through said adjustment means; and
    correcting means, at said outlet, for regulating throughput fluid flow at said outlet, said correcting means including a correcting number exposed to fluid pressure at said outlet applying a force thereon in a first direction and an accumulator applying a biasing force on said correcting member in said first direction, said correcting member also being exposed to the fluid pressure at said inlet through said compensator bore to apply force on said correcting member in a second direction opposite to said first direction.

2. A flow control valve according to claim 1 wherein said adjustment means comprises a measuring diaphragm coupled to and adjustable by an impedance spindle, said impedance spindle incorporating said compensator bore, said compensator bore being in fluid communication with a first compression chamber; and
    an operational piston serving as the correcting member is movably arranged in said first compression chamber and subdivides said first compression chamber into at least first and second partial chambers connected by at least one passage, said partial chambers having volumes which vary dependent on settings of said operational piston.

3. A flow control valve according to claim 2 wherein said operational piston comprises
    a largest surface being acted upon by fluid pressure in said first partial chamber;
    a middle-sized surface being acted upon by fluid pressure in said second partial chamber and by said biasing force of said accumulator; and
    a smallest surface being acted upon by the fluid pressure at said outlet;
    said surfaces having different surface areas.

4. A flow control valve according to claim 3 wherein the sum of the surface areas of said smallest and middle-sized surfaces are essentially equal to the surface area of said largest surface; and
    said smallest and said middle-sized surfaces are arranged on one side of said operational piston, and said largest surface is arranged on an opposite side of said operational piston.

5. A flow control valve according to claim 2 wherein said impedance spindle is guided for longitudinal movement in said operational piston; and
    said operational piston is guided for longitudinal movement along a wall of a receiving bore, said wall at least partially limiting a second compression chamber, said second compression chamber including at least first and second connections respectively coupled thereto through said measuring diaphragm and through said operational piston.

6. A flow control valve according to claim 5 wherein said measuring diaphragm comprises at least one slotted hole coupling said compensator bore with said second compression chamber.

7. A flow control valve according to claim 6 wherein said slotted hole comprises at least two sides oriented and connected at an acute angle with an apex on at least one line of communication.

8. A flow control valve according to claim 7 wherein said measuring diaphragm is adjusted by said impedance spindle such that an extended setting thereof over said slotted hole eliminates fluid communication between said first connection and said second compression chamber; and
    withdrawal of said impedance spindle into a retracted setting increases fluid volume flow through said first connection, said slotted hole forming an intermediate chamber receiving fluid flow form said first connection and conveying the fluid flow into said second compression chamber such that fluid flow increases into said second compression chamber in the retracted setting of said impedance spindle.

9. A flow control valve according to claim 5 wherein said second connection comprises a standard diaphragm adjusted by longitudinal movement of said operational piston.

10. A flow control valve according to claim 5 wherein said wall of said receiving bore is part of a cartridge.

11. A flow control valve according to claim 5 wherein said receiving bore comprises three different bore portions arranged consecutively along a longitudinal axis of said receiving bore, said bore portions having transverse dimensions which decrease progressively in a direction toward said measuring diaphragm.

12. A flow control valve according to claim 5 wherein said wall of said receiving bore is part of a valve housing.

13. A flow control valve according to claim 12 wherein said receiving bore comprises three different bore portions arranged consecutively along a longitudinal axis of said receiving bore, said bore portions having transverse dimensions which decrease progressively in a direction toward said measuring diaphragm.

14. A flow control valve according to claim 2 wherein said impedance spindle is coupled to a correcting element for manual operation.

15. A flow control valve according to claim 14 wherein said impedance spindle comprises a measuring scale on an end thereof remote from said measuring diaphragm.

16. A flow control valve according to claim 1 wherein the flow control valve is a two-way valve.

17. A flow control valve according to claim wherein said adjustment means comprises an impedance spindle, said compensator bore extending longitudinally through said impedance spindle.

* * * * *

UNITED STATES PATENT AND TRADEMARK OFFICE
CERTIFICATE OF CORRECTION

PATENT NO. : 5,004,006
DATED     : April 2, 1991
INVENTOR(S) : Rudiger Jung

It is certified that error appears in the above-identified patent and that said Letters Patent is hereby corrected as shown below:

Column 9, line 33, "number", should read -- member --.

Signed and Sealed this

Fifteenth Day of September, 1992

Attest:

DOUGLAS B. COMER

*Attesting Officer*      *Acting Commissioner of Patents and Trademarks*